(12) United States Patent
Lundin

(10) Patent No.: US 7,182,860 B2
(45) Date of Patent: Feb. 27, 2007

(54) OIL COLLECTING APPARATUS AND A METHOD FOR COLLECTING OIL OR THE LIKE

(75) Inventor: Sune Lundin, Hangö (FI)

(73) Assignee: Bent Larsen, Porvoo (FI)

( * ) Notice: Subject to any disclaimer, the term of this patent is extended or adjusted under 35 U.S.C. 154(b) by 245 days.

(21) Appl. No.: 10/344,665

(22) PCT Filed: Aug. 21, 2001

(86) PCT No.: PCT/FI01/00735

§ 371 (c)(1),
(2), (4) Date: Aug. 5, 2003

(87) PCT Pub. No.: WO02/16699

PCT Pub. Date: Feb. 28, 2002

(65) Prior Publication Data

US 2004/0026340 A1    Feb. 12, 2004

(30) Foreign Application Priority Data

Aug. 22, 2000 (FI) .................................. 20001850

(51) Int. Cl.
*C02F 1/40* (2006.01)
(52) U.S. Cl. ............. 210/173; 210/242.3; 210/776; 210/923; 241/38; 241/DIG. 17
(58) Field of Classification Search ........... 210/774, 210/776, 173, 175, 179, 242.1, 242.3, 923
See application file for complete search history.

(56) References Cited

U.S. PATENT DOCUMENTS

| | | | | |
|---|---|---|---|---|
| 3,614,873 A | * | 10/1971 | Cole et al. | 62/66 |
| 4,039,454 A | * | 8/1977 | Miller et al. | 210/242.3 |
| 4,053,406 A | * | 10/1977 | Deslauriers et al. | 210/774 |
| 4,747,361 A | * | 5/1988 | Lundin | 210/242.3 |
| 4,831,955 A | * | 5/1989 | Lundin | 210/242.3 |
| 5,292,207 A | * | 3/1994 | Scott | 405/207 |
| 6,592,765 B1 | * | 7/2003 | Mykkanen | 210/747 |
| 2004/0026340 A1 | * | 2/2004 | Lundin | 210/776 |
| 2005/0051501 A1 | * | 3/2005 | Salmi et al. | 210/776 |

FOREIGN PATENT DOCUMENTS

| | | |
|---|---|---|
| DE | 39 09 417 | 9/1990 |
| GB | 2 033 785 | 5/1980 |
| SE | 429 839 | 10/1983 |

* cited by examiner

*Primary Examiner*—Robert James Popovics
(74) *Attorney, Agent, or Firm*—Young & Thompson

(57) ABSTRACT

An oil collecting apparatus (1) and a method for collecting oil or the like comprises a frame (5) designed to form a restricted space with the surface of water or ice (VL), and a discharge opening (8) for discharging water and oil from side restricted space. For efficient recovery of oil, the apparatus comprises elements (7,10) for lowering the air pressure in the restricted space, such that the water level rises higher inside the frame (5) than outside it, and a disintegrator (10) arranged rotatably in the frame (5), the rotational movement of the disintegrator emulsifying the oil mixed with the water and breaking possible pieces of ice (13) in the restricted space, such that the water-oil mixture can be removed from the restricted space via the discharge opening (8).

17 Claims, 5 Drawing Sheets

Figure 2:
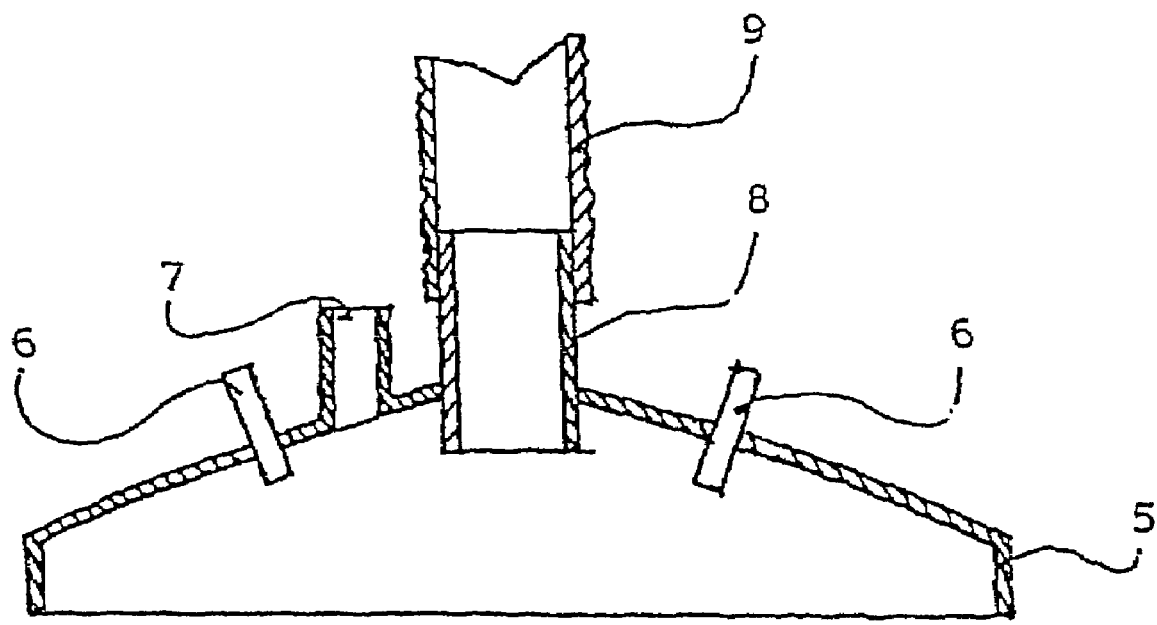

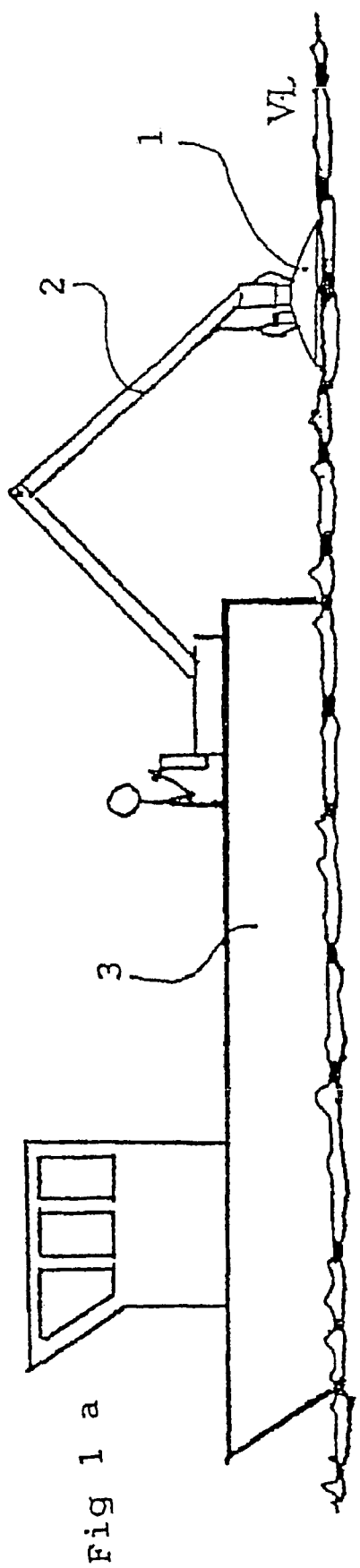
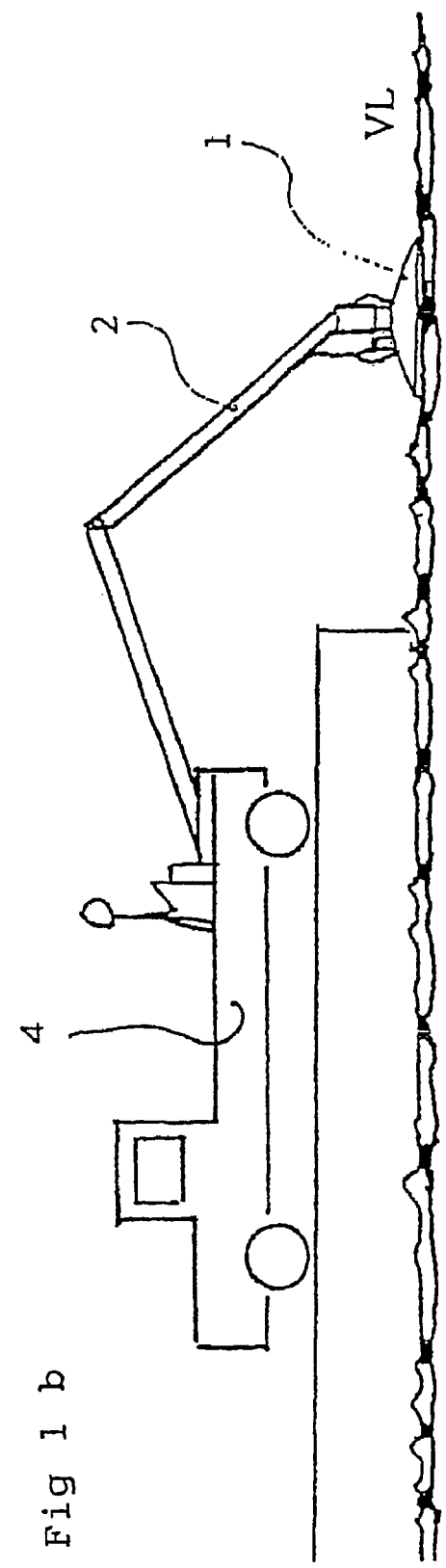

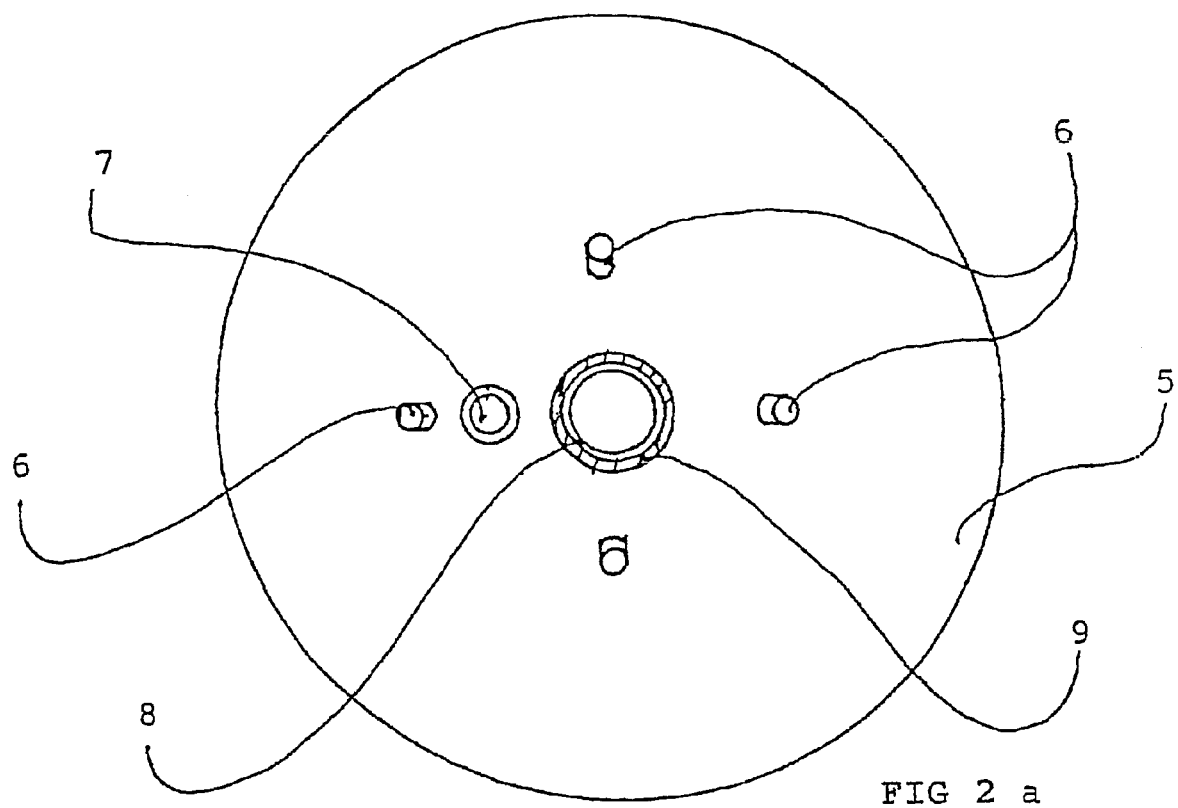
FIG 2 a
FIG 2 b
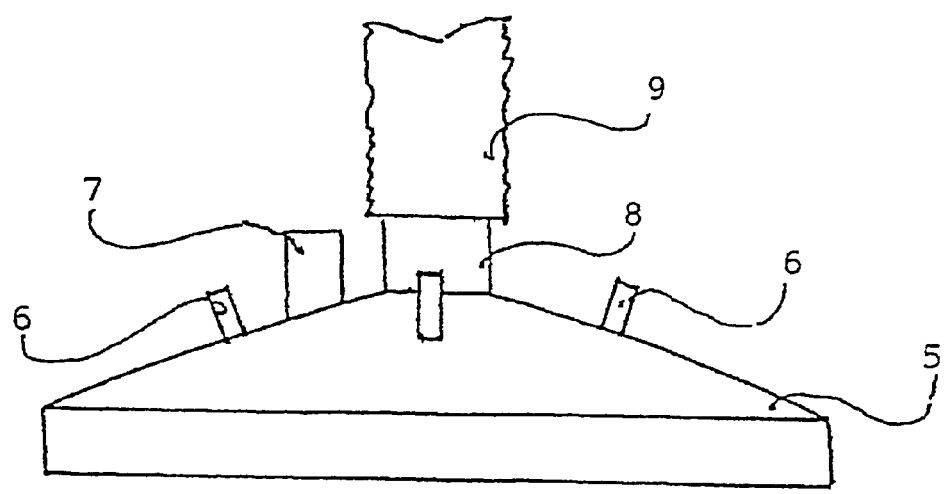

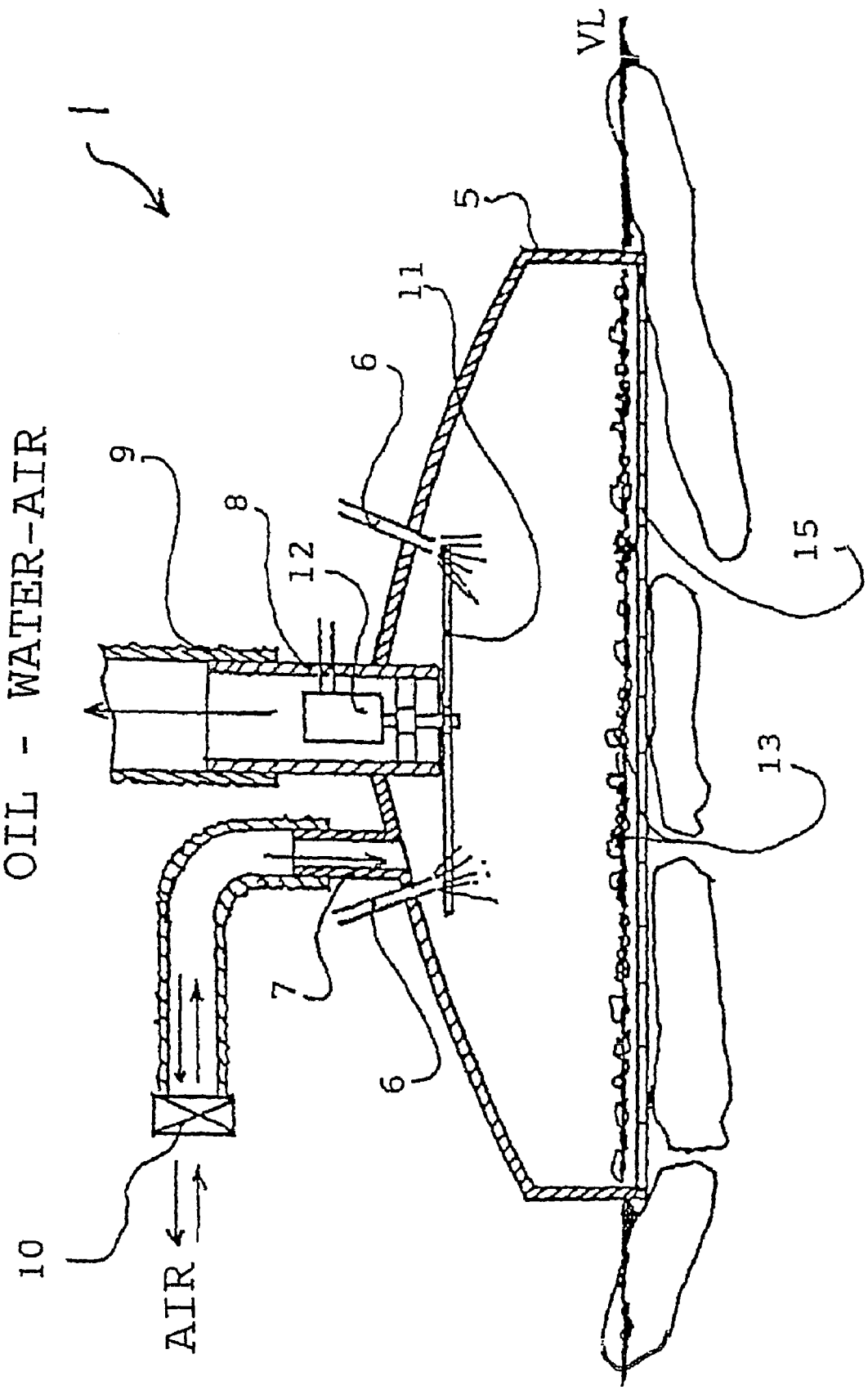

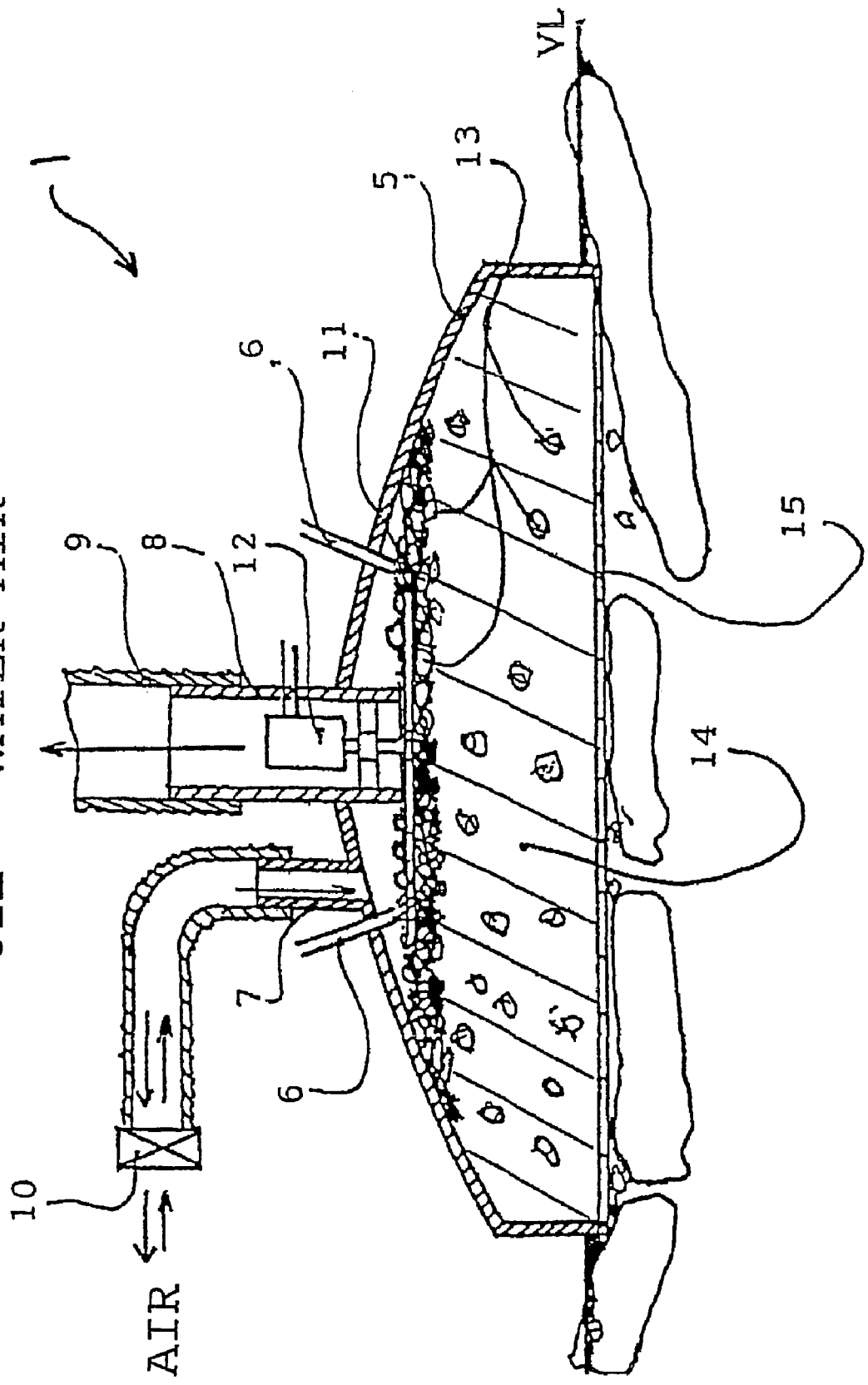

OIL COLLECTING APPARATUS AND A METHOD FOR COLLECTING OIL OR THE LIKE

The present invention relates to an apparatus and a method for collecting oil or the like. The invention relates particularly to an apparatus and a method suitable for collecting oil in ice conditions.

Prior art arrangements for removing oil from water in ice conditions include sinking ice blocks and lifting them up from water. When ice blocks are sunk they are also simultaneously rinsed with water. If ice blocks are lifted from water they should be rinsed mechanically with water. In any case, with each method a large number of smaller sections of ice are recovered with the oil. This creates a problem since the pieces of ice take up most of the volume of the oil recovery space. Another problem is that such a mass of oil and water cannot be pumped. Therefore it has to be recovered either by bagging it up or by collecting it into separate containers, whereafter the ice is melted.

The purpose of the present invention is to solve the problem described above and to provide an efficient and simple arrangement for collecting oil, which can be applied particularly to oil recovery in ice conditions. This is achieved by an oil collecting apparatus according to the invention comprising a frame shaped to form a restricted space with the surface of water or ice, and a discharge opening for discharging from the frame water and oil provided therein. The oil collecting apparatus according to the invention is characterized in that the apparatus comprises means for lowering air pressure in said restricted space, such that the water level rises higher inside the frame than outside it, and a disintegrator arranged rotatably in the frame, the rotational movement of the disintegrator emulsifying the oil mixed with the water and breaking possible pieces of ice in said restricted space, such that the water-oil mixture can be removed from said restricted space via the discharge opening.

The invention also relates to a method for collecting oil or the like. The method according to the invention is characterized by forming a restricted space, one side of which is restricted by the surface of water or ice, lowering the air pressure in said restricted space to raise the water level in said restricted space, rotating a disintegrator in the restricted space to emulsify oil mixed with the water and to break possible pieces of ice, and pumping the water-oil mixture out of said restricted space.

The invention is based on the idea that oil can be recovered efficiently when the water-oil mixture is lifted to a disintegrator that is rotated in a restricted space so as to emulsify the oil and to break the pieces of ice possibly contained therein. This produces in the restricted space a pumpable mixture, which can be removed therefrom by pumping. The arrangement according to the invention is particularly advantageous in ice conditions, since the chunks of ice cannot prevent the pumping of the recovered mixture, nor do they require a very large storage space.

The preferred embodiments of the apparatus and the method according to the invention are disclosed in the appended dependent claims 2 to 6, 8 and 9.

In the following, the invention will be described in more detail by way of example with reference to the accompanying drawings, in which FIGS. 1a and 1b illustrate an apparatus according to the invention fastened to a crane, FIG. 2a is a top view of the frame of the apparatus according to the invention, FIG. 2b is a side view of the frame shown in FIG. 2a, FIG. 2c shows the cross-section of the frame of the apparatus shown in FIGS. 2a and 2b, and FIGS. 3a and 3b illustrate the apparatus according to the invention and the operation thereof.

FIGS. 1a and 1b illustrate an apparatus according to the invention fastened to a crane. In the situation shown in FIG. 1a, the apparatus 1 is fastened to a crane 2 mounted on a vessel 3. In the situation shown in FIG. 1b, the crane 2 is in turn mounted on a vehicle 4. The crane 2 is used to install the apparatus according to the invention in a desired location near the waterline VL, such that the frame of the apparatus forms a restricted space with the surface of the water. In ice conditions the apparatus is lifted on ice so that it presses the ice blocks at least partly downwards either by its own weight or by means of additional force produced by the crane.

After oil has been removed from the location of the apparatus 1, the apparatus is moved to the next location by means of the crane 2. The apparatus 1 is controlled for example from the vessel 3 or the vehicle 4 via the crane 2.

FIGS. 2a to 2c show top, side and cross-sectional views of the frame 5 of the apparatus according to the invention. FIGS. 2a to 2c show nozzles arranged in the upper part of the frame 5 for spraying water into the frame during use. The frame also comprises an air control opening 7 and a discharge opening 8, which is connected to a suction hose 9 for pumping the oil-water mixture out of the restricted space. The air control opening 7 can be provided with an air control valve or the like.

The structure of the frame 5 is preferably such that the frame is made entirely of transparent material, or alternatively, the frame comprises a transparent section. Therefore the person operating the apparatus is able to see the developments inside the frame during use. In the embodiment shown in the figures, the frame 5 has a funnel-like shape.

FIGS. 3a and 3b illustrate the apparatus 1 according to the invention and the operation thereof. The apparatus shown in FIGS. 3a and 3b has a corresponding frame as disclosed in connection with FIGS. 2a to 2c, and it can be moved by the crane as shown in FIGS. 1a and 1b.

FIG. 3a is a cross-sectional view of an apparatus 1 mounted on ice blocks. Nozzles 6 provided in the frame 5 of the apparatus 1 are connected to a source of water. An air control opening 7 is connected to an air control valve 10, by means of which the person operating the apparatus can conclude whether the air control opening is connected to the open air, whether the connection via the control opening is closed or whether the control opening 7 is connected to a vacuum system, which produces suction via the control opening. A discharge opening 8 is connected via a suction hose 9 to the vacuum system via a control valve (not shown in the figures). When the control valve is open, suction is generated in the frame 5 via the discharge opening 8 (via the vacuum system). If the control valve is closed, suction ends.

When the apparatus is used in ice conditions, it is lowered onto ice blocks, which thereafter sink due to the weight of the apparatus 1 or the propulsive force of the crane. The ice blocks are sunk such that a closed air space, or a restricted space, is provided inside the frame, as shown in FIGS. 3a and 3b. The open lower part of the frame 5 is provided with a grid 15 to prevent large ice blocks or other great objects from entering the restricted space.

FIG. 3a shows that the frame of the apparatus is provided with a disintegrator 11 and a drive unit 12 that rotates it. The drive unit 12 can be a hydraulic motor or the like. In an alternative, the water supplied to the nozzles 6 is conducted via a rotor wheel connected to the disintegrator 11, so that the flow of water provides sufficient rotational movement of the rotor wheel and the disintegrator 12. The function of the disintegrator during use is to emulsify oil and to break any pieces of ice coming into contact with the disintegrator. The disintegrator 11 can be formed of, for example, a metal rod, a piece of chain or rotating steel blades.

During use the apparatus 1 operates as follows. After the frame 5 of the apparatus has been set on ice blocks and the blocks have been sunk as shown in FIG. 3a, a restricted space is formed inside the frame 5. The air control valve 10 is then used to connect the control opening 7 to the vacuum system. This produces suction, which lowers the air pressure inside the frame 5. Due to the reduced air pressure the water level inside the frame 5 rises above the normal waterline VL outside the frame. The rising water carries with it the oil removed from the ice blocks, as well as some pieces of ice 13. FIG. 3b shows a situation where the water level is at a desired height. At the desired height the disintegrator 11 is in contact with the water-oil mixture 14 and possible pieces of ice, and the water-oil mixture 14 can be removed via the discharge opening 8.

It is possible to detect approximately when the water level has risen sufficiently if the frame 5 of the apparatus is at least partly transparent, or alternatively, the apparatus can comprise a sensor or a switch that produces a control impulse when the desired height has been reached. Such a control impulse can switch on an indicator light on the control panel of the apparatus, for example, or the apparatus can alternatively comprise automatics receiving the control impulse.

When the water level has reached the desired height shown in FIG. 3b, the control opening 7 is closed by means of the air control valve 10. Therefore the water level remains at the desired height. The power unit 12 is thereafter activated to rotate the disintegrator 11, unless it has already been activated. The disintegrator 11 then emulsifies the oil and also cuts into smaller parts the pieces of ice that have been carried by the water to the level of the disintegrator. Water can simultaneously be sprayed into the frame via the nozzles 6. The water that is sprayed improves the disintegration of the ice since it melts the pieces of ice at least partly, so that they become smaller and smaller.

As the disintegrator rotates and the water flows via the nozzles 6, the oil is emulsified and the pieces of ice mixed therein disintegrate first into crystals and finally dissolve into water. When the pieces of ice are sufficiently small, the control valve (not shown in the figures) of the discharge opening 8 is opened. This creates suction via the discharge opening, which helps remove the oil-water mixture by pumping via the hose 9. Small pieces of ice, which are considerably smaller than originally, can also flow with the mixture.

If the frame of the apparatus is at least partly transparent, the person operating the apparatus can approximately detect when the pieces of ice are sufficiently small. Alternatively, the user may conclude this from the sounds the apparatus 1 produces, since they change as the pieces of ice are disintegrated into increasingly smaller fragments. Another alternative is that the disintegrator 11 is always used for a constant period of time before the control valve of the discharge opening 8 opens. Therefore, if desired the apparatus can be provided with an automatic control system, which is programmed to rotate the disintegrator for a predetermined constant period of time before the water-oil mixture is removed via the discharge opening 8.

The apparatus 1 can also provide a pumping effect for rinsing large ice blocks. In such a case the water level inside the frame 5 is raised and lowered repeatedly by means of the air control valve 10. The flow of water back and forth rinses all the oil stuck to the ice blocks, so that the oil level can finally be raised to the desired height with the water.

If the melting of ice is to be improved, the frame of the apparatus can be heated by a suitable arrangement. The frame can also be provided with floating devices.

It is described above how the water level is adjusted via a separate control opening 7. If desired, such a control opening can be omitted so that the water level is also adjusted via the opening 8. However, a good reason for using a separate control opening is that the cross-sectional area of the control opening can be smaller than the area of the discharge opening, which makes it easier to accurately control the water level.

It should be understood that the above description and the related drawings are only intended to illustrate the present invention, and that the apparatus can be modified so as to differ from the above. For example, the frame of the apparatus can be quadrangular, in which case several adjacent apparatuses can be used over a larger area. The operating principle of the apparatus can also be applied as an auxiliary device to improve prior art technologies, such as the use of a brush drum, in which case the lower part of the frame is connected to a cleaning comb. Therefore, different variations and modifications of the invention will be evident to those skilled in the art without deviating from the scope of the invention disclosed in the appended claims.

The invention claimed is:

1. An oil collecting apparatus (1) comprising a frame (5) shaped to form a restricted space with the surface of water or ice (VL), and
   a discharge opening (8) for discharging water and oil from said restricted space, characterized in that the apparatus comprises
   means (7, 10) for lowering air pressure in said restricted space, such that the water level rises higher inside the frame (5) than outside it, and
   a disintegrator (11) arranged rotatably in the frame (5), the rotational movement of the disintegrator emulsifying the oil mixed with the water and breaking possible pieces of ice (13) in said restricted space, such that the wateroil mixture can be removed from said restricted space via the discharge opening (8).

2. An oil collecting apparatus according to claim 1, characterized in that said means for lowering the air pressure comprise an air control valve (10), which can be set in at least three alternative states, so that in the first state the restricted space is connected to a vacuum source, which lowers the air pressure in the restricted space, in the second state the restricted space is connected to the air outside the frame so that the air pressure reaches the outside air pressure, and in the third state the air control valve is closed, so that the connection from the restricted space to the outside air or to the vacuum source via the air control valve is disconnected.

3. An oil collecting apparatus according to claim 2, characterized in that the apparatus (1) further comprises means (6) for feeding water into said restricted space to improve the emulsification and the breaking of possible pieces of ice.

4. An oil collecting apparatus according to claim 2, characterized in that the frame (5) is formed at least partly of transparent material.

5. An oil collecting apparatus according to claim 2, characterized in that the frame (5) comprises heating means for raising the temperature of the frame.

6. An oil collecting apparatus according to claim 2, characterized in that the part of the frame (5) located adjacent to the surface of water or ice (VL) is provided with a grid (15), which prevents large objects from entering said restricted space.

7. An oil collecting apparatus according to claim 1, characterized in that the apparatus (1) further comprises means (6) for feeding water into said restricted space to improve the emulsification and the breaking of possible pieces of ice.

8. An oil collecting apparatus according to claim 7, characterized in that the frame (5) is formed at least partly of transparent material.

9. An oil collecting apparatus according to claim 7, characterized in that the frame (5) comprises heating means for raising the temperature of the frame.

10. An oil collecting apparatus according to claim 7, characterized in that the part of the frame (5) located adjacent to the surface of water or ice (VL) is provided with a grid (15), which prevents large objects from entering said restricted space.

11. An oil collecting apparatus according to claim 1, characterized in that the frame (5) is formed at least partly of transparent material.

12. An oil collecting apparatus according to claim 11, characterized in that the frame (5) comprises heating means for raising the temperature of the frame.

13. An oil collecting apparatus according to claim 1, characterized in that the frame (5) comprises heating means for raising the temperature of the frame.

14. An oil collecting apparatus according to claim 13, characterized in that the part of the frame (5) located adjacent to the surface of water or ice (VL) is provided with a grid (15), which prevents large objects from entering said restricted space.

15. An oil collecting apparatus according to claim 1, characterized in that the part of the frame (5) located adjacent to the surface of water or ice (VL) is provided with a grid (15), which prevents large objects from entering said restricted space.

16. An oil collecting apparatus according to claim 1, characterized in that the part of the frame (5) located adjacent to the surface of water or ice (VL) is provided with a grid (15), which prevents large objects from entering said restricted space.

17. An oil collecting apparatus, comprising:
a frame forming a restricted space, one side of which is restricted by the surface of water or ice,
a discharge opening for discharging water and oil from the restricted space,
means for lowering the air pressure in said restricted space to raise the water level in said restricted space,
a disintegrator and means for rotating the disintegrator in the restricted space to emulsify oil mixed with the water and to break possible pieces of ice, and
a pumping apparatus for pumping the oil-water mixture out of said restricted space.

* * * * *